US012704432B1

(12) United States Patent
Zamanzadeh et al.

(10) Patent No.: US 12,704,432 B1
(45) **Date of Patent: *Aug. 11, 2026**

(54) ELECTROCHEMICAL CRACK DETECTOR

(71) Applicant: Matergenics, Inc., Pittsburgh, PA (US)

(72) Inventors: Mehrooz Zamanzadeh, Pittsburgh, PA (US); Carolyn Tome, Pittsburgh, PA (US); Aaron Ulmer, Pittsburgh, PA (US)

(73) Assignee: Matergenics, Inc., Pittsburgh, PA (US)

( * ) Notice: Subject to any disclaimer, the term of this patent is extended or adjusted under 35 U.S.C. 154(b) by 442 days.

This patent is subject to a terminal disclaimer.

(21) Appl. No.: 18/372,329

(22) Filed: Sep. 25, 2023

Related U.S. Application Data

(63) Continuation of application No. 17/953,256, filed on Sep. 26, 2022, now Pat. No. 11,796,416, which is a continuation of application No. 17/320,275, filed on May 14, 2021, now Pat. No. 11,460,369, which is a continuation of application No. 17/102,736, filed on Nov. 24, 2020, now Pat. No. 11,009,425.

(60) Provisional application No. 62/941,401, filed on Nov. 27, 2019.

(51) Int. Cl.
*G01N 27/30* (2006.01)
*G01M 5/00* (2006.01)

(52) U.S. Cl.
CPC .......... *G01M 5/0033* (2013.01); *G01N 27/30* (2013.01)

(58) Field of Classification Search
CPC ..... G01N 2203/006; G01N 2203/0062; G01N 2203/0064; G01N 2203/0066; G01N 2203/0067; G01N 27/30; G01N 33/38; G01M 5/0033; G01M 5/0083
See application file for complete search history.

(56) References Cited

U.S. PATENT DOCUMENTS

| | | | |
|---|---|---|---|
| 3,942,296 | A | 3/1976 | Meyer |
| 4,455,212 | A | 6/1984 | Baxter |
| 5,864,229 | A | 1/1999 | Lund |
| 7,034,660 | B2 | 4/2006 | Watters et al. |

(Continued)

FOREIGN PATENT DOCUMENTS

| | | | |
|---|---|---|---|
| CA | 2601516 | A1 | 9/2006 |
| CA | 2893678 | A1 | 9/2006 |

(Continued)

OTHER PUBLICATIONS

Allen M., et al., “Stick Electrode, and Welding Basics,” The Fabricator/ FMA Communications, 2017, pp. 1-9.

(Continued)

*Primary Examiner* — Gurpreet Kaur
(74) *Attorney, Agent, or Firm* — Thomas Joseph; OGC Law, LLC

(57) ABSTRACT

A system for detecting the formation of a crack in a metal joint includes an electrochemical electrical current detection device. Carrier material surrounds the metal joint, at least partially, with conductive media having electrolyte therein. An auxiliary electrode is in electrical contact with the carrier material. The placement of the auxiliary electrode in electrical contact with carrier material forms a passive layer on the metal joint. The formation of a crack in the metal joint ruptures the passive layer to generate a current for detection by the electrochemical electrical current detection device.

20 Claims, 2 Drawing Sheets

(56) References Cited

U.S. PATENT DOCUMENTS

| | | | | |
|---|---|---|---|---|
| 7,560,920 | B1 | 7/2009 | Ouyang et al. | |
| 7,572,360 | B2 * | 8/2009 | Moshier | G01N 17/02 205/775.5 |
| 7,986,218 | B2 | 7/2011 | Watters et al. | |
| 8,746,077 | B2 | 6/2014 | Ozkul et al. | |
| 9,969,656 | B2 | 5/2018 | Polder et al. | |
| 11,009,425 | B1 * | 5/2021 | Zamanzadeh | G01M 5/0083 |
| 11,460,369 | B1 | 10/2022 | Zamanzadeh et al. | |
| 2002/0154029 | A1 | 10/2002 | Watters et al. | |
| 2006/0170535 | A1 | 8/2006 | Watters et al. | |
| 2010/0163433 | A1 | 7/2010 | Horn | |
| 2012/0060621 | A1 | 3/2012 | Ozkul et al. | |
| 2020/0386714 | A1 | 12/2020 | Haselhuhn et al. | |

FOREIGN PATENT DOCUMENTS

| | | | |
|---|---|---|---|
| CN | 202629360 | U | 12/2012 |
| CN | 202916222 | U | 5/2013 |
| CN | 115791834 | A | 3/2023 |
| DE | 102008025645 | A1 | 12/2009 |
| EP | 0518635 | B1 | 5/2003 |
| JP | H05142186 | A | 6/1993 |
| JP | H05209874 | A | 8/1993 |
| JP | 2000199755 | A | 7/2000 |
| WO | 2006107210 | A1 | 10/2006 |

OTHER PUBLICATIONS

Cook R. A., et al., "Base Connections for Signal/Sign Structures," Department of Civil and Coastal Engineering, College of Engineering, University of Florida, Feb. 2012, pp. 1-181.

Exoinc.com, Non-Destructive Examination Techniques of Tubular Steel Pole. 2021, pp. 1-11.

Kurnyta A., et al., "The Experimental Verification of Direct-Write Silver Conductive Grid and ARIMA Time Series Analysis for Crack Propagation," Sensors, https://www.mdpi.com/journal/sensors, 2021, vol. 21 (6916), pp. 1-15.

Kurnyta A., et al., "The Use of Silver Conductive Paint for Crack Propagation Sensor Customization," IEEE 8th International Workshop on Metrology for AeroSpace, 2021, pp. 631-635.

Olympus, "Eddy Current Weld Inspection," Multimedia Application Notes, 2017, pp. 1-5.

Papazian et al., "Sensors for Monitoring Early Stage Fatigue Cracking," International Journal of Fatigue, 2007, vol. 29, pp. 1668-1680.

PCA, "Corrosion of Embedded Metals," Portland Cement Association, 2019, pp. 1-6.

Reese B. R., "Discussion of Tubular Steel Monopole Base Connections: The Base Weld Toe Crack Phenomenon: Crack Identification and Proposed Severity Classification System," Reese Tower Services, 2015, pp. 1-14.

RTRI., Major Results of Research and Development in Fiscal 2011: Crack Detection System for Steel Structures, Copyright(c) 2013—Railway Technical Research Institute, 2011, 2 pages.

Zamanzadeh M., et al., "Fatigue Failure Analysis Case Studies," Journal of Failure Analysis and Prevention, 2015, vol. 15 (6), pp. 803-809.

* cited by examiner

100

110
112
COMPUTER SYSTEM 130
COMPUTING DEVICE 128
ELECTROCHEMICAL CURRENT DETECTION DEVICE 126
118
110
132
114

132
124
118
120
116
122
114

ELECTROCHEMICAL CRACK DETECTOR

CROSS REFERENCE TO RELATED APPLICATION

This application is a continuation of U.S. patent application Ser. No. 17/953,256 entitled "ELECTROCHEMICAL CRACK DETECTOR" filed Sep. 26, 2022, which is a continuation of U.S. patent application Ser. No. 17/320,275 entitled "ELECTROCHEMICAL CRACK DETECTOR" filed May 14, 2021, which is a continuation of U.S. patent application Ser. No. 17/102,736 entitled "ELECTROCHEMICAL CRACK DETECTOR" filed Nov. 24, 2020, which claims the benefit under 35 U.S.C. § 119(e) of U.S. Provisional Application No. 62/941,401 entitled "ELECTROCHEMICAL CRACK DETECTOR" filed Nov. 27, 2019. All of the foregoing application are incorporated herein by reference.

BACKGROUND

Tubular steel poles are commonly used as support structures have many industrial applications relating to telecommunications, sports lighting, utilities, and transportation. Such poles are generally considered to be reliable, competitively priced, easy to install, and easy to use pricing, and ease of use.

The typical pole structure includes an elongate tubular pole that attaches to a base plate via welding. Unfortunately, such structures typically fail at the weld due to the fact that the poles are subject to vibrations or to other similar repetitive motions. Those types of fatigue failures tend to be catastrophic.

The damage associated with these failures can be significant. In some cases, the failures lead to service interruption. Additionally, the repair/replacement costs associated with subsequent loss of the structure can be substantial. Moreover, the risks associated with these failures represent risks to public safety, welfare, and infrastructure assets, so that there is a need to minimize such risks and costs.

One approach to mitigate these failures can involve timely periodic inspections and maintenance. However, the cost of such programs can be substantial. As a result, there is a need for an improved system to monitor the failure of tubular steel pole structures.

SUMMARY

The following summary is provided to introduce a selection of concepts in a simplified form that are further described below in the detailed description. This summary is not intended to identify key features or essential features of the claimed subject matter, nor is it intended to be used to limit the scope of the claimed subject matter.

In various implementations, a system for detecting the formation of a crack in a metal joint includes an electrochemical electrical current detection device. Carrier material surrounds the metal joint, at least partially, with conductive media having electrolyte therein. An auxiliary electrode is in electrical contact with the carrier material. The placement of the auxiliary electrode in electrical contact with carrier material forms a passive layer on the metal joint. The formation of a crack in the metal joint ruptures the passive layer to generate a current for detection by the electrochemical electrical current detection device.

In other implementations, a system detects a fatigue toe crack in a metal pole assembly, wherein the metal pole assembly includes a pole, a base plate, and a connection between the pole and the base plate. An electrochemical electrical current detection device is provided. A metal ribbon surrounds the connection, at least partially. Carrier material is positioned between the metal ribbon and the connection, the carrier material having conductive media with electrolyte therein. The carrier material is in electrical contact with the connection and the metal ribbon with the metal ribbon forming a passive layer on a portion of the metal pole assembly. The formation of a crack in portion of the metal pole ruptures the passive layer to generate a current for detection by the electrochemical electrical current detection device.

In yet other implementations, a method for detecting the formation of a crack in a metal joint is provided. The metal joint is surrounded, at least partially, with conductive media having electrolyte therein to form a passive layer thereon. An auxiliary electrode is placed in electrical contact with the carrier material to form an electrochemical cell with the metal joint. An electrochemical electrical current detection device is coupled with the electrochemical cell so that the formation of a crack within the metal joint ruptures the passive layer to generate an electrical current that is measured by the electrochemical electrical current detection device.

In other implementations, a crack detection sensor in electrical contact with an electrochemical electrical current detection device within a metal pole assembly having a metal joint therein. The crack detection sensor includes carrier material for surrounding the metal joint, at least partially, with conductive media having electrolyte therein. An auxiliary electrode is in electrical contact with the carrier material. The placement of the auxiliary electrode in in electrical contact with carrier material causes the formation of a passive layer on the metal joint. The formation of a crack in the metal joint causes the passive layer to rupture, thereby generating a current for detection by the electrochemical electrical current detection device.

These and other features and advantages will be apparent from a reading of the following detailed description and a review of the appended drawings. It is to be understood that the foregoing summary, the following detailed description and the appended drawings are explanatory only and are not restrictive of various aspects as claimed.

DETAILED DESCRIPTION

The subject disclosure is directed to an electrochemical crack detector or detection system. More specifically, the subject disclosure is directed to systems, methods, and apparatus for detecting cracks in metal joints, namely "toe cracks" resulting from fatigue in metal pole assemblies in which tubular metal poles are connected to base plates via welding. The system utilizes an electrochemical cell that generates a current when a crack forms in the weld. The current can be detected with an electrochemical electrical current detection device.

The detailed description provided below in connection with the appended drawings is intended as a description of examples and is not intended to represent the only forms in which the present examples can be constructed or utilized. The description sets forth functions of the examples and sequences of steps for constructing and operating the examples. However, the same or equivalent functions and sequences can be accomplished by different examples.

References to "one embodiment," "an embodiment," "an example embodiment," "one implementation," "an implementation," "one example," "an example" and the like, indicate that the described embodiment, implementation or example can include a particular feature, structure or characteristic, but every embodiment, implementation or example can not necessarily include the particular feature, structure or characteristic. Moreover, such phrases are not necessarily referring to the same embodiment, implementation or example. Further, when a particular feature, structure or characteristic is described in connection with an embodiment, implementation or example, it is to be appreciated that such feature, structure or characteristic can be implemented in connection with other embodiments, implementations or examples whether or not explicitly described.

Numerous specific details are set forth in order to provide a thorough understanding of one or more embodiments of the described subject matter. It is to be appreciated, however, that such embodiments can be practiced without these specific details.

Various features of the subject disclosure are now described in more detail with reference to the drawings, wherein like numerals generally refer to like or corresponding elements throughout. The drawings and detailed description are not intended to limit the claimed subject matter to the particular form described. Rather, the intention is to cover all modifications, equivalents and alternatives falling within the spirit and scope of the claimed subject matter.

Figure 1:
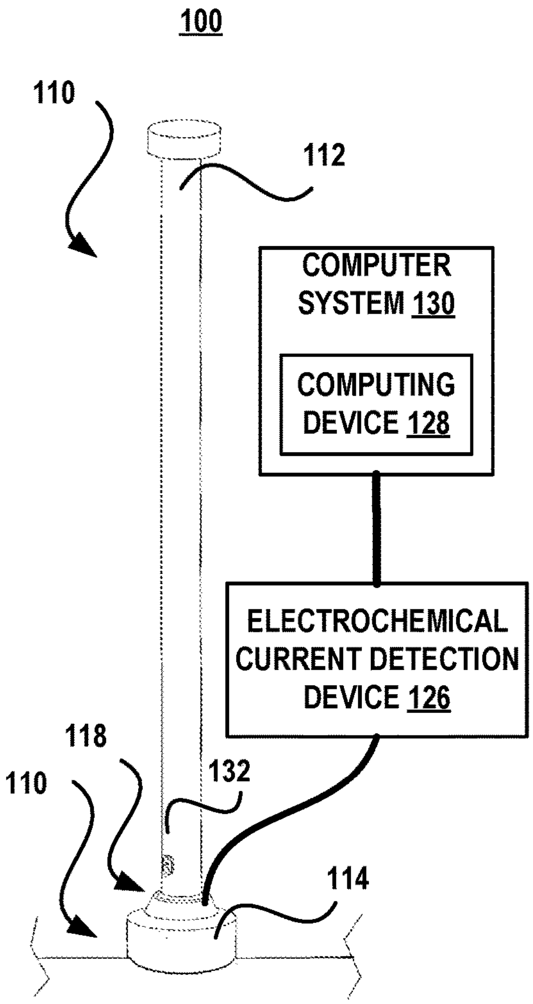
FIG. 1 is a fragmentary perspective view of a crack detection system in accordance in accordance with the subject matter of this disclosure.
Figure 2:
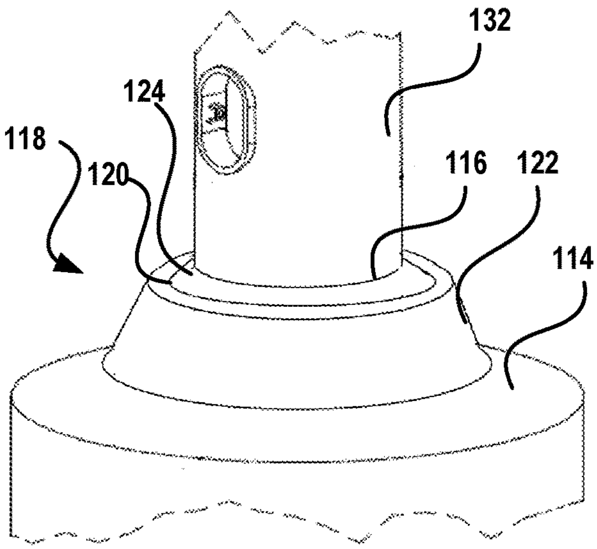
FIG. 2 is a fragmentary perspective view of a crack sensor in accordance with the subject matter of this disclosure.

Referring now to FIGS. 1-2, there is shown an electrochemical crack detection system, generally designated by the numeral 100. The system 100 is connected to a tubular metal pole assembly 110, which includes a tubular metal pole 112 connected to a metal base plate 114 at a joint 116. The system 100 can be used to detect cracks in the joint 116. In some embodiments, the pole assembly 110 will include an anchor (not shown) that connects to the base plate 114.

The tubular metal pole 112 can be subject to cyclic loads or vibrations at various cycles that can be caused by wind loading conditions. The cyclical loads or vibrations can cause fatigue failures at the joint 116. The system 100 utilizes a sensor 118 that includes an electrochemical cell that is formed between the metal joint 116 and a layered structure 120 that surrounds the joint 116, at least partially.

The layered structure 120 includes a layer 122 having one or more metals that occupy a higher position on the galvanic series as compared to the metal within the metal joint 116. In many instances, the pole assembly 110, including the joint 116, will be formed from a ferrous material, so that the layer 122 can form a ribbon of aluminum, magnesium and/or zinc. The layer 122 can be a passive layer or passivated layer within the layered structure 120.

A second layer 124 includes conductive media, such as paste and/or concrete with electrolyte therein. The second layer 124 is positioned between the joint 116 and the layer 122.

The joint 116, the layer 122, and the layer 124 form the electrochemical cell within the sensor 118. The joint 116 forms an electrode. The layer 122 forms an electrode. The layer 124 provides the electrolyte to connect the joint 116 to the layer 122 electrochemically.

The formation of a crack within the joint 116 can cause the layer 124 to rupture. The rupture of the layer 124 causes the electrochemical cell within the sensor 118 to generate an electric current, which can be detected by an electrochemical electrical current detection device 126. The electrochemical electrical current detection device 126 can communicate with a computing device 128, which can be part of a computer system 130. The electrochemical electrical current detection device 126 can be an ammeter, a current detection device, a potentiostat, a potentiometer, a multimeter or other similar device.

The joint 116 can be produced by shop-welding the base plate 114 to the bottom of a shaft 132 on the pole 112 offsite at a manufacturing facility. The weld between the base plate 114 and the pole shaft 132 is the sole, non-redundant structural connection therebetween. As a result, the joint 116 is essentially for the structural adequacy and integrity of the pole assembly 110. An unmitigated failure at the joint 116 usually results in a catastrophic failure of the pole assembly 110.

The type of joint 116 that connects the pole shaft 132 to the base plate 114 can vary depending on the type of pole and/or the manufacturer. Typical pole base connection weld details include complete joint penetration groove weld (CJP) and socket style (double fillet weld) connections. In such configurations, the base plate 114 is butted against the shaft 132 and consists of a circumferential single-bevel groove weld with 100% complete weld penetration and a reinforcing fillet weld. The connection zone is all weld material. The CJP connection style is a cost economical method of fabrication and, generally, is the base connection of choice for most major pole manufacturers.

In some instances, a socket connection sleeves over the shaft 132 and is welded with double fillet welds above and below the base plate 114. This connection utilizes simple fillet welds. This type of connection does not require a non-destructive examination (NDE) ultrasonic test post-fabrication, which reduces quality assurance costs.

The socket connection is easier to fabricate for a round pole than for a polygonal pole. While other joints may be possible (including shop welded base plate stiffeners), the majority of anchor-based pole assemblies utilize CJP connections or socket connections.

As shown in FIGS. 1-2, the pole assembly 110, including the joint 116, can be formed from various metals and metal alloys. In most instances, the pole assembly 110 and/or the joint 116 will be formed from one or more ferrous alloys, including iron alloys, a steel alloys, a stainless steel alloys, and other similar alloys. Iron alloys can include gray cast iron, ductile iron, or some combination thereof.

It is further contemplated that the pole assembly 110 and the joint 116 can include one or more high-performance alloys. High-performance alloys can include iron, iron alloys, nickel and nickel alloys. Suitable iron alloys include cast irons, gray irons, white irons, ductile irons, malleable irons, wrought iron, steels, crucible steels, carbon steels, spring steels, alloy steels, maraging steels, stainless steels, weathering steels, tool steels, and other specialty steels Suitable nickel alloys include chromel, ferronickel, hastelloys, inconels, monels, nichrome, and nickel-carbon alloys.

The electrochemical electrical current detection device 126 can be any suitable device configured to measure and/or to detect the current formed by the electrochemical cell. The electrochemical electrical current detection device 126 can be a digital or an analog device. In most instances, the electrochemical electrical current detection device 126 will be configured to interface with the computing device 128 and/or the computer system 130. The electrochemical electrical current detection device 126 can be incorporated into other devices, such as a multimeter.

The computing device 128 can be a suitable microcontroller, laptop computer, personal computer, network computer, or other similar device. The computing device 128 can be a component of the computer system 130. The computer system 130 can be implemented by various types of operating environments, computer networks, platforms, frameworks, computer architectures, and/or computing devices, including computing device 128.

Implementations of computer system 130 can be described in the context of a system configured to perform various steps, methods, and/or functionality in accordance with the described subject matter. It is to be appreciated that a computer system can be implemented by one or more computing devices, such as computing device 128. Implementations of computer system 130 also can be described in the context of "computer-executable instructions" that are executed to perform various steps, methods, and/or functionality in accordance with aspects of the described subject matter.

In general, a computer system can include one or more processors and storage devices (e.g., memory and disk drives) as well as various input devices, output devices, communication interfaces, and/or other types of devices. A computer system also can include a combination of hardware and software. It can be appreciated that various types of computer-readable storage media can be part of a computer system. As used herein, the terms "computer-readable storage media" and "computer-readable storage medium" do not mean and unequivocally exclude a propagated signal, a modulated data signal, a carrier wave, or any other type of transitory computer-readable medium. In various implementations, a computer system can include a processor configured to execute computer-executable instructions and a computer-readable storage medium (e.g., memory and/or additional hardware storage) storing computer-executable instructions configured to perform various steps, methods, and/or functionality in accordance with aspects of the described subject matter.

Computer-executable instructions can be embodied and/or implemented in various ways such as by a computer program (e.g., client program and/or server program), a software application (e.g., client application and/or server application), software code, application code, source code, executable files, executable components, program modules, routines, application programming interfaces (APIs), functions, methods, objects, properties, data structures, data types, and/or the like. Computer-executable instructions can be stored on one or more computer-readable storage media and can be executed by one or more processors, computing devices, and/or computer systems to perform particular tasks or implement particular data types in accordance with aspects of the described subject matter.

Figure 3:
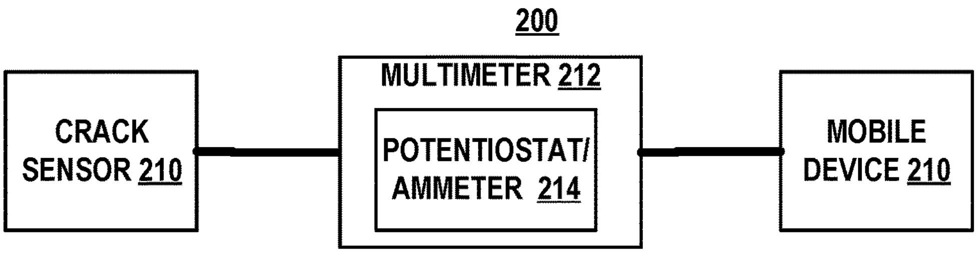
FIG. 3 is a block diagram of another embodiment of a crack detection system in accordance with the subject matter of this disclosure.

Referring now to FIG. 3 with continuing reference to the foregoing figures, there is shown another embodiment of a crack detection system, generally designated by the numeral 200. Like the embodiment shown in FIGS. 1-2, the crack detection system 200 includes a sensor 210. The sensor 210 is substantially identical to sensor 118 shown in FIGS. 1-2.

Unlike the embodiment shown in FIGS. 1-2, the system 200 includes a multimeter 212 that includes a potentiostat/ammeter 214. In this exemplary embodiment, the multimeter 212 is a multi-channel circuit testing Mooshimeter™ multimeter. Mooshimeter™ is a trademark of Mooshim Engineering LLC in San Francisco, CA.

The multimeter 212 can connect to a mobile device 216 through a wireless connection through a Bluetooth® 4.0 connection. Bluetooth® is a registered certification mark owned by Bluetooth Sig, Inc., of Kirkland, Washington. The multimeter 212 can provide the ability to analyze the current through a high-resolution graphical display. The mobile device 216 can be a handheld computer, a portable computer, a smartphone, an electronic tablet, or other similar device.

Figure 4:
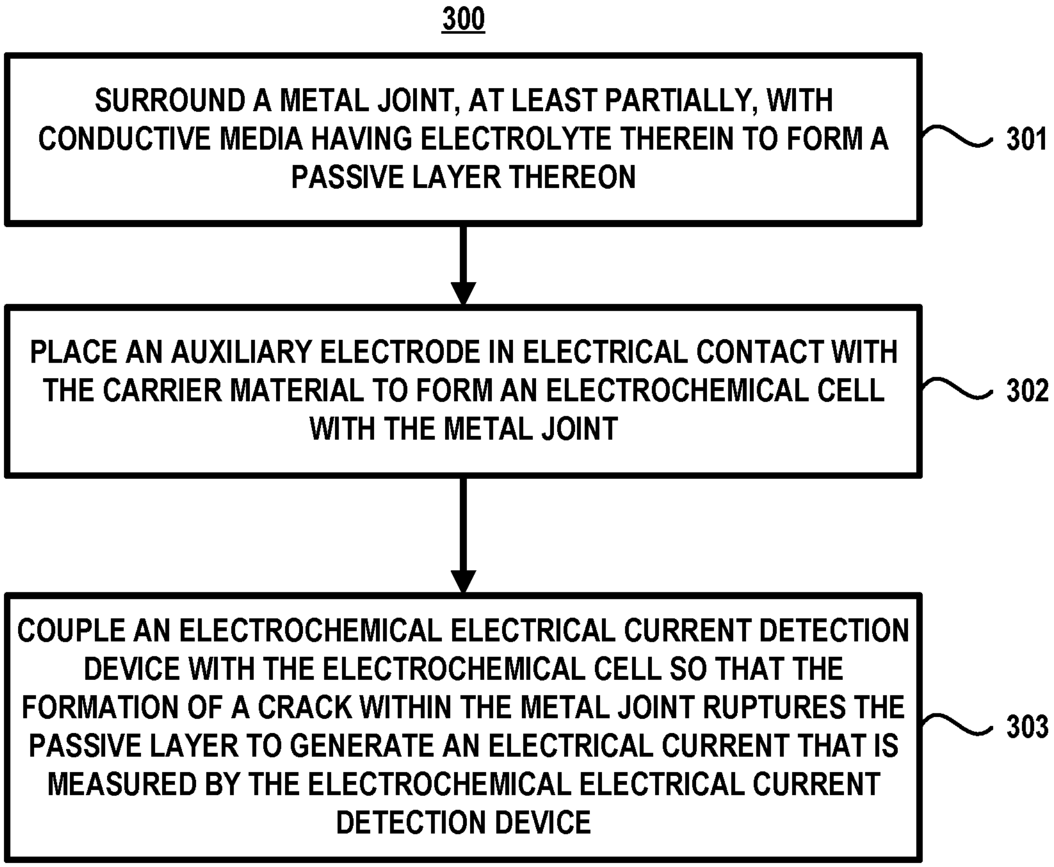
FIG. 4 is an exemplary process in accordance with the subject disclosure.

Referring now to FIG. 4 with continuing reference to the foregoing figures, an exemplary method, generally designated with the numeral 400, for detecting cracks in pole assemblies. The method 400 can be performed using the system 100 shown in FIGS. 1-2 and/or the system 200 shown in FIG. 3.

At 401, a metal joint is surrounded, at least partially, with conductive media having electrolyte therein to form a passive layer thereon. In this exemplary embodiment, the metal joint can be the metal joint 116 shown in FIGS. 1-2. The conductive media can be the media in the layer 124 shown in FIGS. 1-2.

At 402, an auxiliary electrode is placed in electrical contact with the carrier material to form an electrochemical cell with the metal joint. In this exemplary embodiment, the auxiliary electrode can be formed from the layer 122 shown in FIGS. 1-2.

At 403, an electrochemical electrical current detection device is coupled with the electrochemical cell so that the formation of a crack within the metal joint ruptures the passive layer to generate an electrical current that is measured by the electrochemical electrical current detection device. In this exemplary embodiment, the electrochemical electrical current detection device 126 can be the electrochemical electrical current detection device 126 shown in FIGS. 1-2 and/or the potentiostat/ammeter 214 shown in FIG. 3.

SUPPORTED FEATURES AND EMBODIMENTS

The detailed description provided above in connection with the appended drawings explicitly describes and supports various features of an electrochemical crack detection system. By way of illustration and not limitation, supported embodiments include a system for detecting the formation of a crack in a metal joint comprising: an electrochemical electrical current detection device, carrier material for surrounding the metal joint, at least partially, with conductive media having electrolyte therein, and an auxiliary electrode in electrical contact with the carrier material, wherein the placement of the auxiliary electrode in electrical contact with carrier material forms a passive layer on the metal joint, and wherein the formation of a crack in the metal joint ruptures the passive layer to generate a current for detection by the electrochemical electrical current detection device.

Supported embodiments include the foregoing system, wherein the carrier material forms a ribbon around the metal joint.

Supported embodiments include any of the foregoing systems, wherein the metal joint includes a substantially cylindrical region surrounded by the metal joint.

Supported embodiments include any of the foregoing systems, wherein the carrier material is selected from the group consisting of paste and concrete.

Supported embodiments include any of the foregoing systems, wherein the metal joint includes an iron alloy and the auxiliary electrode includes a predetermined metal that creates a passive layer on a galvanized coating.

Supported embodiments include any of the foregoing systems, wherein the predetermined metal is selected from the group consisting of zinc, aluminum, and magnesium.

Supported embodiments include any of the foregoing systems, further comprising: a computing device, wherein the electrochemical electrical current detection device communicates with the computing device.

Supported embodiments include any of the foregoing systems, further comprising: a computer system, wherein the computing device is incorporated in the computer system.

Supported embodiments include any of the foregoing systems, wherein the electrochemical electrical current detection device is selected from the group consisting of an ammeter, a current detection device, a potentiostat, a potentiometer, and a multimeter.

Supported embodiments include any of the foregoing systems, wherein the electrochemical electrical current detection device is an ammeter and the ammeter is incorporated into a multimeter Supported embodiments include any of the foregoing systems, further comprising: a mobile device, wherein the multimeter communicates with the mobile device.

Supported embodiments include a kit, a method, an apparatus, and/or means for implementing any of the foregoing systems or a portion thereof.

Supported embodiments include a system for detecting a fatigue toe crack in a metal pole assembly, wherein the metal pole assembly includes a pole, a base plate, and a connection between the pole and the base plate, the system comprising: an electrochemical electrical current detection device, a metal ribbon surrounding the connection, at least partially, carrier material between the metal ribbon and the connection, the carrier material having conductive media with electrolyte therein, wherein the carrier material is in electrical contact with the connection and the metal ribbon with the metal ribbon forming a passive layer on a portion of the metal pole assembly, and wherein the formation of a crack in portion of the metal pole ruptures the passive layer to generate a current for detection by the electrochemical electrical current detection device.

Supported embodiments include the foregoing system, wherein the carrier material is selected from the group consisting of a conductive paste and concrete.

Supported embodiments include any of the foregoing systems, wherein the portion of the metal pole assembly includes an iron alloy and the passive layer includes a metal that is selected from the group consisting of zinc, aluminum, and magnesium.

Supported embodiments include any of the foregoing systems, further comprising: a computing device, wherein the electrochemical electrical current detection device communicates with the computing device.

Supported embodiments include any of the foregoing systems, further comprising: a computer system, wherein the computing device is incorporated in the computer system.

Supported embodiments include any of the foregoing systems, wherein the electrochemical electrical current detection device is selected from the group consisting of an ammeter, a current detection device, a potentiostat, a potentiometer, and a multimeter.

Supported embodiments include any of the foregoing systems, wherein electrochemical electrical current detection device is an ammeter and the ammeter is incorporated into a multimeter.

Supported embodiments include any of the foregoing systems, further comprising: a mobile device, wherein the multimeter communicates with the mobile device.

Supported embodiments include a kit, a method, an apparatus, and/or means for implementing any of the foregoing systems or a portion thereof.

Supported embodiments include a method for detecting the formation of a crack in a metal joint comprising the steps of: surrounding the metal joint, at least partially, with conductive media having electrolyte therein to form a passive layer thereon, placing an auxiliary electrode in electrical contact with the carrier material to form an electrochemical cell with the metal joint, and coupling an electrochemical electrical current detection device with the electrochemical cell so that the formation of a crack within the metal joint ruptures the passive layer to generate an electrical current that is measured by the electrochemical electrical current detection device.

Supported embodiments include the foregoing method, further comprising: converting the electric current into a digital signal.

Supported embodiments include any of the foregoing methods, further comprising: monitoring the digital signal with a computing device.

Supported embodiments include a system, a kit, an apparatus, and/or means for implementing any of the foregoing methods or a portion thereof.

Within a metal pole assembly having a metal joint therein, supported embodiments include a crack detection sensor in electrical contact with an electrochemical electrical current detection device, the crack detection sensor comprising: carrier material for surrounding the metal joint, at least partially, with conductive media having electrolyte therein, and an auxiliary electrode in electrical contact with the carrier material, wherein the placement of the auxiliary electrode in in electrical contact with carrier material causes the formation of a passive layer on the metal joint, and wherein the formation of a crack in the metal joint causes the passive layer to rupture, thereby generating a current for detection by the electrochemical electrical current detection device. Supported embodiments can provide various attendant and/or technical advantages in terms of a simple, cost effective system to monitor fatigue failure in tubular metal pole assemblies.

The detailed description provided above in connection with the appended drawings is intended as a description of examples and is not intended to represent the only forms in which the present examples can be constructed or utilized.

It is to be understood that the configurations and/or approaches described herein are exemplary in nature, and that the described embodiments, implementations and/or examples are not to be considered in a limiting sense, because numerous variations are possible.

The specific processes or methods described herein can represent one or more of any number of processing strategies. As such, various operations illustrated and/or described can be performed in the sequence illustrated and/or described, in other sequences, in parallel, or omitted. Likewise, the order of the above-described processes can be changed.

Although the subject matter has been described in language specific to structural features and/or methodological acts, it is to be understood that the subject matter defined in the appended claims is not necessarily limited to the specific features or acts described above. Rather, the specific features and acts described above are presented as example forms of implementing the claims.

What is claimed is:

1. A crack detection sensor in electrical contact with an electrochemical electrical current detection device within a metal pole assembly having a metal joint therein, the crack detection sensor comprising:

carrier material for surrounding the metal joint, at least partially, with conductive media having electrolyte therein, and an auxiliary electrode in electrical contact with the carrier material, wherein the carrier material is selected from the group consisting of paste and concrete, the metal joint includes an iron alloy, and the auxiliary electrode includes a predetermined metal that creates a passive layer on a galvanized coating, wherein the placement of the auxiliary electrode in electrical contact with carrier material causes the formation of an electrochemical cell on the metal joint, and wherein the formation of a crack in the metal joint causes the passive layer to rupture, thereby generating a current for detection by the electrochemical electrical current detection device.

2. The crack detection sensor of claim 1, wherein the carrier material forms a ribbon around the metal joint.

3. The crack detection sensor of claim 2, wherein the crack detector sensor is positioned within a metal pole assembly having a metal joint including a substantially cylindrical region surrounded by the metal joint.

4. The crack detection sensor of claim 1, wherein the predetermined metal is selected from the group consisting of zinc, aluminum, and magnesium.

5. The crack detection sensor of claim 1, wherein the crack detector sensor communicates with a computing device through the electrochemical electrical current detection device.

6. The crack detection sensor of claim 1, wherein the crack detector sensor communicates with a computing device incorporated into a computer system through the electrochemical electrical current detection device.

7. The crack detection sensor of claim 1, wherein the crack detection sensor is in electrical contact with an electrochemical electrical current detection device selected from the group consisting of an ammeter, a current detection device, a potentiostat, a potentiometer, and a multimeter.

8. The crack detection sensor of claim 1, wherein the crack detector sensor communicates with a mobile device through the electrochemical electrical current detection device.

9. The crack detection sensor of claim 8, wherein the crack detector sensor communicates with a mobile device through the electrochemical electrical current detection device with the electrochemical electrical current detection device being an ammeter incorporated into a multimeter.

10. A crack detection sensor in electrical contact with an electrochemical electrical current detection device, within a metal pole assembly having a pole, a base plate, and a connection between the pole and the base plate, the crack detection sensor comprising:

a metal ribbon surrounding the connection, at least partially, carrier material between the metal ribbon and the connection, the carrier material having conductive media with electrolyte therein, and an auxiliary electrode in electrical contact with the carrier material, wherein the carrier material is selected from the group consisting of paste and concrete, the connection includes an iron alloy, and the auxiliary electrode includes a predetermined metal that creates a passive layer on a galvanized coating, wherein the carrier material is in electrical contact with the connection and the metal ribbon with the metal ribbon forming an electrochemical cell on a portion of the metal pole assembly, and wherein the formation of a crack in portion of the metal pole ruptures the passive layer to generate a current for detection by the electrochemical electrical current detection device.

11. The crack detection sensor of claim 10, wherein the predetermined metal is selected from the group consisting of zinc, aluminum, and magnesium.

12. The crack detection sensor of claim 10, wherein the crack detector sensor communicates with a computing device through the electrochemical electrical current detection device.

13. The crack detection sensor of claim 10, wherein the crack detector sensor communicates with a computing device incorporated into a computer system through the electrochemical electrical current detection device.

14. The crack detection sensor of claim 10, wherein the crack detection sensor is in electrical contact with an electrochemical electrical current detection device selected from the group consisting of an ammeter, a current detection device, a potentiostat, a potentiometer, and a multimeter.

15. The crack detection sensor of claim 10, wherein the crack detector sensor communicates with a mobile device through the electrochemical electrical current detection device.

16. The crack detection sensor of claim 15, wherein the crack detector sensor communicates with a mobile device through the electrochemical electrical current detection device with the electrochemical electrical current detection device being an ammeter incorporated into a multimeter.

17. A system for detecting the formation of a crack in a metal joint comprising:

surrounding means for surrounding the metal joint, at least partially, with carrier material selected from the group consisting of paste and concrete with the carrier material having electrolyte therein;

passive layer forming means for forming a passive layer on the metal joint;

electrochemical cell forming means for forming an electrochemical cell on the metal joint; and detecting means for detecting an electric current when the passive layer ruptures due to the formation of a crack within the metal joint.

18. The system of claim 17, wherein passive layer forming means includes a predetermined metal selected from the group consisting of zinc, aluminum, and magnesium.

19. The system of claim 17, further comprising:

means for converting the electric current into a digital signal.

20. The system of claim 19, further comprising:

means for monitoring the digital signal.

* * * * *